(12) United States Patent
Chappell et al.

(10) Patent No.: US 7,762,133 B2
(45) Date of Patent: Jul. 27, 2010

(54) INERTIAL MEASUREMENT UNIT WITH GAS PLENUMS

(75) Inventors: Charles D. Chappell, Treasure Island, FL (US); David A. Bowen, Seminole, FL (US)

(73) Assignee: Honeywell International Inc., Morristown, NJ (US)

(*) Notice: Subject to any disclaimer, the term of this patent is extended or adjusted under 35 U.S.C. 154(b) by 526 days.

(21) Appl. No.: 11/778,965

(22) Filed: Jul. 17, 2007

(65) Prior Publication Data

US 2010/0024550 A1   Feb. 4, 2010

(51) Int. Cl.
*G01P 1/02*   (2006.01)
(52) U.S. Cl. .................................... 73/493; 73/178 R
(58) Field of Classification Search ................ 73/493, 73/510, 514.01, 178 R; 701/220
See application file for complete search history.

(56) References Cited

U.S. PATENT DOCUMENTS

| | | | |
|---|---|---|---|
| 1,315,735 | A | 9/1919 | Michell |
| 2,363,260 | A | 11/1944 | Peskin |
| 2,710,234 | A | 6/1955 | Hansen |
| 2,959,060 | A | 11/1960 | Kunz |
| 2,999,391 | A | 9/1961 | Freebairn et al. |
| 3,039,316 | A | 6/1962 | Slater |
| 3,056,303 | A | 10/1962 | Naylor |
| 3,258,977 | A | 7/1966 | Hoffman |
| 3,269,195 | A | 8/1966 | Cahoon et al. |
| 3,328,595 | A | 6/1967 | Tood, Jr. |
| 3,365,942 | A | 1/1968 | Blazek |
| 3,439,546 | A | 4/1969 | Baker et al. |
| 3,572,856 | A | 3/1971 | McHugh |

(Continued)

FOREIGN PATENT DOCUMENTS

GB   866473   4/1961

(Continued)

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

(Continued)

*Primary Examiner*—John E Chapman
(74) *Attorney, Agent, or Firm*—Fogg & Powers LLC (57) ABSTRACT

An inertial measurement unit comprises a mounting plate with an opening therethrough, and a sensor assembly disposed in the opening of the mounting plate. Upper and lower support shells having shell flanges are attached to upper and lower surfaces of the mounting plate. The upper and lower support shells surround the sensor assembly. A plurality of gas bearing pads each extends through apertures in the upper and lower support shells. Upper and lower gas plenums have plenum flanges attached to the shell flanges of the upper and lower support shells, with the upper and lower gas plenums surrounding the upper and lower support shells. Pressure relief valves are coupled to the plenum flanges of the upper and lower gas plenums. The gas bearing pads and the sensor assembly are separated by a gap when pressurized gas is fed into the upper and lower gas plenums, thereby creating a gas bearing that allows the sensor assembly to be freely suspended and rotated in all directions.

20 Claims, 7 Drawing Sheets

U.S. PATENT DOCUMENTS

| | | | |
|---|---|---|---|
| 3,576,124 A | 4/1971 | O'Connor | |
| 3,670,585 A | 6/1972 | Alexander et al. | |
| 3,769,710 A | 11/1973 | Reister | |
| 3,782,167 A | 1/1974 | Stuelpnagel | |
| 3,938,256 A | 2/1976 | Crocker, Jr. | |
| 4,003,265 A | 1/1977 | Craig et al. | |
| 4,143,466 A | 3/1979 | Quermann | |
| 4,150,579 A | 4/1979 | Vaughn | |
| 4,214,482 A | 7/1980 | Bouchard | |
| 4,244,215 A | 1/1981 | Merhav et al. | |
| 4,290,316 A | 9/1981 | Noar et al. | |
| 4,291,926 A | 9/1981 | Tomioka et al. | |
| 4,413,864 A | 11/1983 | Phillips | |
| 4,458,426 A | 7/1984 | O'Connor et al. | |
| 4,488,041 A | 12/1984 | Baudot | |
| 4,515,486 A | 5/1985 | Ide | |
| 4,671,650 A | 6/1987 | Hirzel et al. | |
| 4,711,125 A | 12/1987 | Morrison | |
| 4,723,735 A | 2/1988 | Eisenhaure et al. | |
| 4,822,181 A | 4/1989 | Egli | |
| 4,917,330 A | 4/1990 | Dulat et al. | |
| 5,067,084 A | 11/1991 | Kau | |
| 5,088,825 A | 2/1992 | Derry et al. | |
| 5,099,430 A | 3/1992 | Hirsch | |
| 5,115,570 A | 5/1992 | Krogmann et al. | |
| 5,319,577 A | 6/1994 | Lee | |
| 5,357,437 A | 10/1994 | Polvani | |
| 5,396,326 A | 3/1995 | Knobbe et al. | |
| 5,410,232 A | 4/1995 | Lee | |
| 5,710,559 A | 1/1998 | Krogmann | |
| 5,716,142 A | 2/1998 | Kristensen et al. | |
| 5,743,654 A | 4/1998 | Ide et al. | |
| 5,745,869 A | 4/1998 | Van Bezooijen | |
| 5,790,049 A | 8/1998 | Harrell | |
| 5,894,323 A | 4/1999 | Kain et al. | |
| 6,145,393 A | 11/2000 | Canton | |
| 6,172,665 B1 | 1/2001 | Bullister | |
| 6,481,672 B1 | 11/2002 | Goodzeit et al. | |
| 6,594,623 B1 | 7/2003 | Wang et al. | |
| 6,594,911 B2 | 7/2003 | Brunstein et al. | |
| 6,629,778 B1 | 10/2003 | Enderle et al. | |
| 6,711,952 B2 | 3/2004 | Leamy et al. | |
| 6,741,209 B2 | 5/2004 | Lee | |
| 6,786,084 B2 | 9/2004 | Schroeder et al. | |
| 6,802,221 B2 | 10/2004 | Hedeen et al. | |
| 6,826,478 B2 | 11/2004 | Riewe et al. | |
| 6,918,186 B2 | 7/2005 | Ash et al. | |
| 7,003,399 B1 | 2/2006 | Chappell | |
| 7,066,653 B2 | 6/2006 | Dourlens et al. | |
| 7,340,344 B2 | 3/2008 | Chappell | |
| 7,444,210 B2 | 10/2008 | Breed | |
| 2002/0077189 A1 | 6/2002 | Tuer et al. | |
| 2003/0120425 A1 | 6/2003 | Stanley et al. | |
| 2004/0015323 A1 | 1/2004 | Boyton | |
| 2004/0075737 A1 | 4/2004 | Kirby | |
| 2004/0089083 A1 | 5/2004 | Bailey | |
| 2004/0098178 A1 | 5/2004 | Brady et al. | |
| 2004/0212803 A1 | 10/2004 | Siegl et al. | |
| 2006/0058961 A1 | 3/2006 | Chappell et al. | |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |
| WO | 2006060715 | 6/2006 |

OTHER PUBLICATIONS

El-Sheimy et al., "Structural Monitoring Using Wirelessly Connected MEMS-Based Snesors-Towards System Development", Feb. 18, 2003, pp. 1-10, Publisher: ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

Ng, "The Optical Mouse as a Two-Dimensional Displacement Sensor", "Sensors and Actuators A", Oct. 1, 2003, pp. 21-25, vol. 107, No. 1, Publisher: Elseveier Sequoia S.A., Published in: Lausanne, CH.

INERTIAL MEASUREMENT UNIT WITH GAS PLENUMS

RELATED APPLICATIONS

This application is related to commonly assigned U.S. patent application Ser. No. 11/004,184, filed on Dec. 3, 2004, entitled "GAS SUPPORTED INERTIAL SENSOR SYSTEM AND METHOD" which is incorporated herein by reference.

This application is also related to commonly assigned U.S. patent application Ser. No. 11/778,970 filed on even date herewith, entitled "INERTIAL MEASUREMENT UNIT WITH WIRELESS POWER TRANSFER GAP CONTROL" which is incorporated herein by reference.

BACKGROUND

Precision inertial navigation systems are used in civil and military aviation, missiles and other projectiles, submarines and other underwater vehicles, space exploration technology, as well as in numerous other vehicle applications. A typical inertial navigation system (INS) measures the position and attitude of a vehicle by measuring the accelerations and rotations applied to the vehicle's inertial frame of reference. Since the typical INS is not dependent on other points of reference, it is resistant to jamming and deception.

An INS usually includes an inertial measurement unit (IMU) combined with control mechanisms, allowing the path of a vehicle to be controlled according to the position determined by the INS. An IMU contains instruments for position monitoring. The typical INS requires concentric sets of ball bearing supported gimbals that allow instruments to freely rotate in vehicle maneuvers and further allow for manipulation during a calibration routine.

A typical inertial sensor assembly (ISA) within the IMU is an electronic device that contains internally embedded instrumentation (e.g., one or more accelerometers and gyroscopes) that communicates with other vehicle systems. Data from the internally embedded instrumentation is typically communicated to the other vehicle systems through moving contact devices, such as slip rings or twist caps. The slip rings and twist caps provide a constant communication link for the data without restricting the movement of the ISA.

An INS typically uses either gyrostablized platforms or 'strapdown' systems. The gyrostabilized system allows a vehicle's roll, pitch and yaw angles to be measured directly at the bearings of the gimbals. The INS is traditionally rotated using electromagnetic motors on a ball bearing supported gimbal axis. Disadvantages of this scheme is that it employs multiple expensive precision mechanical parts including moving parts that can wear out or jam, and is vulnerable to gimbal lock. In addition, for each degree of freedom, another gimbal is required thus increasing the size and complexity of the INS. Therefore, to get complete three dimensional calibration, at least three gimbals are needed. In strapdown systems, lightweight computers eliminate the need for gimbals, and the sensors are simply strapped to the vehicle. This reduces the cost, eliminates gimbal lock, removes the need for some calibrations, and increases reliability by eliminating some of the moving parts.

Another type of INS floats a sensor assembly with neutral buoyancy in a fluid. This approach requires an extremely complex assembly, sensitive temperature control, and sealing challenges that add considerably to the cost of deployment and maintenance. Also, many of these fluids are hazardous or require a high degree of purity.

Inertial navigation systems that use spherical gas bearings typically require very tight tolerances on the surrounding support shell. These tight tolerances increase the cost of the system and limit the design flexibility of the system.

SUMMARY

The present invention relates to an inertial measurement unit comprising a mounting plate with an upper surface, a lower surface, and an opening therethrough, with a sensor assembly disposed in the opening of the mounting plate. An upper support shell has a shell flange attached to the upper surface of the mounting plate. The upper support shell surrounds an upper portion of the sensor assembly and has a plurality of apertures. A lower support shell has a shell flange attached to the lower surface of the mounting plate. The lower support shell surrounds a lower portion of the sensor assembly and has a plurality of apertures. A plurality of gas bearing pads extend through the apertures in the upper and lower support shells, and the plurality of gas bearing pads are configured to receive pressurized gas. An upper gas plenum has a plenum flange attached to the shell flange of the upper support shell, with the upper gas plenum surrounding the upper support shell. A first pressure relief valve is coupled to the plenum flange of the upper gas plenum. A lower gas plenum has a plenum flange attached to the shell flange of the lower support shell, with the lower gas plenum surrounding the lower support shell. A second pressure relief valve is coupled to the plenum flange of the lower gas plenum. The gas bearing pads and the sensor assembly are separated by a gap when pressurized gas is fed into the upper and lower gas plenums, thereby creating a gas bearing that allows the sensor assembly to be freely suspended and rotated in all directions.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It should be understood that other embodiments may be utilized without departing from the scope of the present invention. The following detailed description is, therefore, not to be taken in a limiting sense.

The present invention is directed to a high performance inertial measurement unit (IMU) that utilizes a series of gas bearings to provide a no contact support for a sensor assembly. The gas bearings allow the sensor assembly to be freely rotated in any direction at various stages (e.g., pre-launch calibration, thrust following, low frequency angular isolation). A pair of gas plenums employed in the IMU supplies gas to the gas bearings simultaneously without the use of a complex set of hoses and valves.

The present IMU is made with concentric shells, with gas bearing pads embedded in an inner support shell that is surround by the gas plenums. The concentric shells minimize the cost associated with matching the geometry of inner elements and outer support structures. This configuration creates a high pressure zone of gas that is contained around a gas input orifice of the gas bearing pads. Any number or arrangement of gas bearing pads can be used to supply the gas for the gas bearings.

Use of the plenums eliminates most of the plumbing required to provide the high pressure gas to the back side of each gas bearing pad. For example, individual gas lines or hoses that would typically be attached to each gas bearing pad are eliminated, yet equal gas pressure can be maintained at each bearing pad contained within a plenum. Since the parts count is reduced, leak paths are reduced and reliability is enhanced The present IMU can be used in aircraft, missiles and other projectiles, submarines, space vehicles, and the like. The IMU can be implemented in a high reliability guidance system that can operate for many years without maintenance. The IMU is particularly useful in precision inertial guidance systems for strategic missiles such as intercontinental ballistic missiles (ICBMs). Such missiles require the ultimate in reliability in order for the missiles to hit their targets.

The present invention may also be employed in other industrial applications such as those requiring uniform distribution of gas or liquids for cooling or other purposes. The present approach also allows for balancing of flow adjustments outside of a closed space prior to final assembly of a device.

Further details of the present invention are discussed as follows with respect to the drawings.

Figure 1:
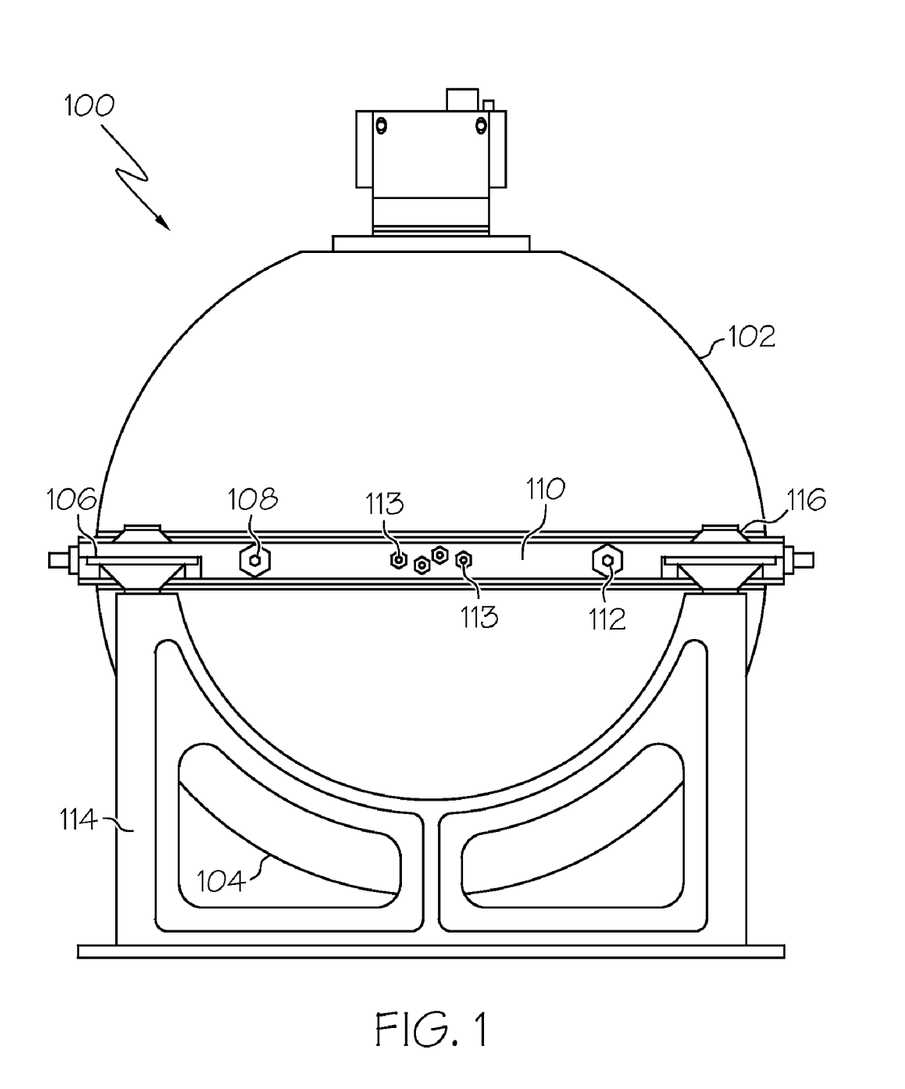
FIG. 1 is a side elevation view of an inertial measurement unit for an inertial navigation system according to one embodiment.

FIG. 1 depicts an inertial measurement unit (IMU) 100 according to one embodiment for use in an inertial navigation system. The IMU 100 includes an upper gas plenum 102 and a lower gas plenum 104, which are attached to a mounting plate 106 on upper and lower surfaces thereof. The upper gas plenum 102 can have an operating gas pressure that is the same as the operating gas pressure of lower gas plenum 104. Alternatively, upper gas plenum 102 can have an operating gas pressure that is different from the operating gas pressure of lower gas plenum 104.

For example, the pressures in the upper and lower gas plenums 102, 104 can be varied to compensate for the direction of loading. In one exemplary implementation, in order to compensate for g-forces during launch of a vehicle such as a missile, more pressure can be provided to the lower gas plenum than in the upper gas plenum to maintain a uniform thin film gas bearing for the IMU. During reentry of the vehicle, which is decelerating, more pressure can be provided in the upper gas plenum than in the lower gas plenum to compensate for the pressure differential in the IMU.

The gas plenums 102, 104 can be adapted to provide radiation shielding for IMU 100 if desired. Such radiation shielding is beneficial in protecting internal instruments and electronics from various kinds and levels of radiation. For example, the outer casing of the gas plenums can include heavy materials such as lead, tungsten, silver, and the like, which block radiation. In addition, different levels of radiation can require varying thicknesses for the outer casing of the gas plenums. The outer casing of the gas plenums can be varied in thickness and material density to provide appropriate radiation protection.

Heavier gas plenums with radiation shielding can be interchanged with lighter gas plenums that lack radiation shielding as needed without changing the overall function of the IMU. For example, if a mission requires radiation shielding, an IMU 100 with unshielded gas plenums can be easily changed to a radiation shielded IMU by changing out the unshielded gas plenums for radiation shielded gas plenums.

At least one high pressure jet nozzle 108 can be coupled to a gas inlet on a side 110 of mounting plate 106 for upper gas plenum 102. At least one high pressure jet nozzle 112 can also be coupled to a gas inlet on side 110 for lower gas plenum 104. The mounting plate 106 also has a set of jet nozzles 113 on side 110 for angular position control of a spherical sensor assembly discussed in further detail hereafter. Other jet nozzles corresponding to jet nozzles 108, 112, and 113 can be located on other sides of mounting plate 106 as desired. The lower gas plenum 104 is set in a support frame 114, which can be attached to mounting plate 106 by a set of fasteners 116 located at each corner of mounting plate 106. In one embodiment, support frame 114 prevents IMU 100 from moving.

Figure 2:
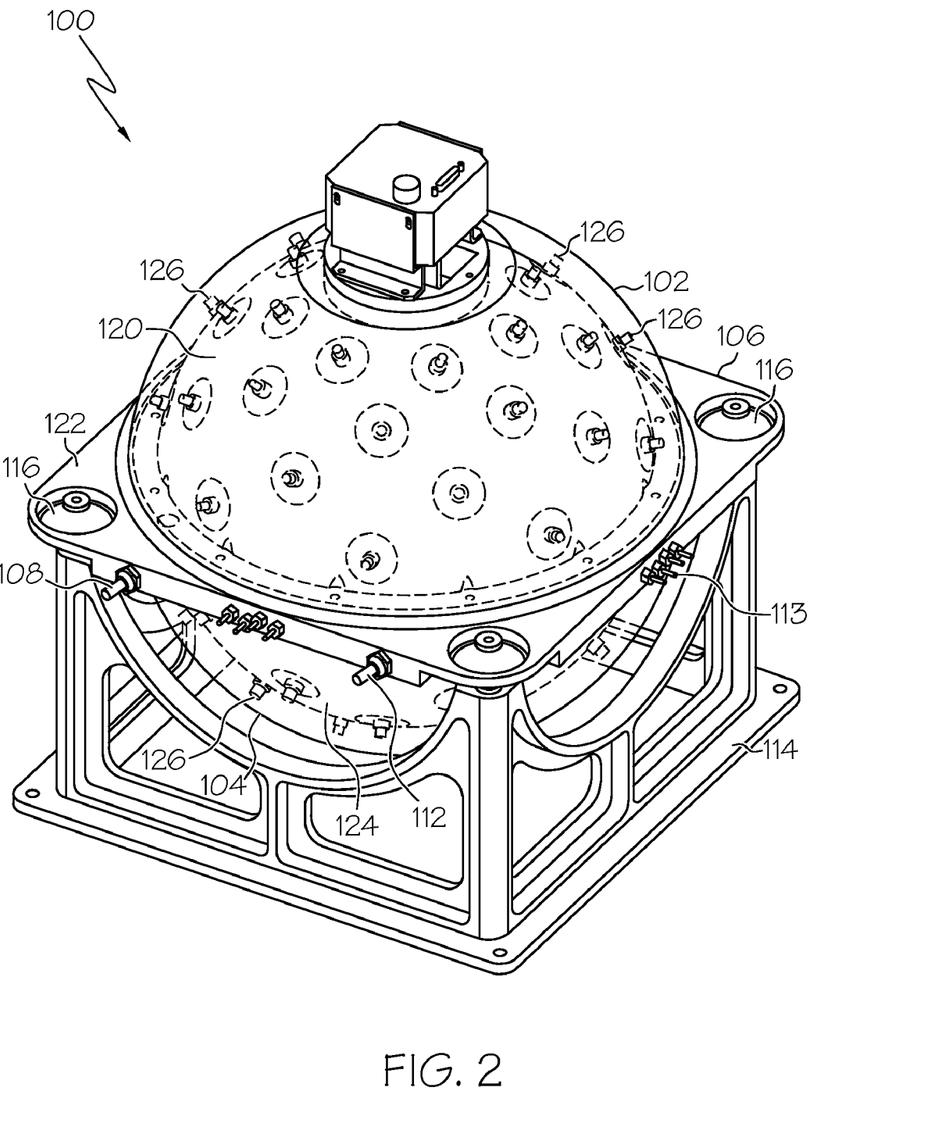
FIG. 2 is a perspective view of the inertial measurement unit of FIG. 1.

FIG. 2 is a perspective view of IMU 100, except that the upper and lower gas plenums 102, 104 are depicted in translucent form so that some of the interior structure of IMU 100 can be seen. As shown, upper gas plenum 102 houses an upper support shell 120 that is attached to an upper surface 122 of mounting plate 106. A lower support shell 124 is attached to the lower surface of mounting plate 106. The gas plenums and support shells can be attached to mounting plate 106 by any suitable fasteners such as bolts, screws, rivets, or the like.

Figure 3:
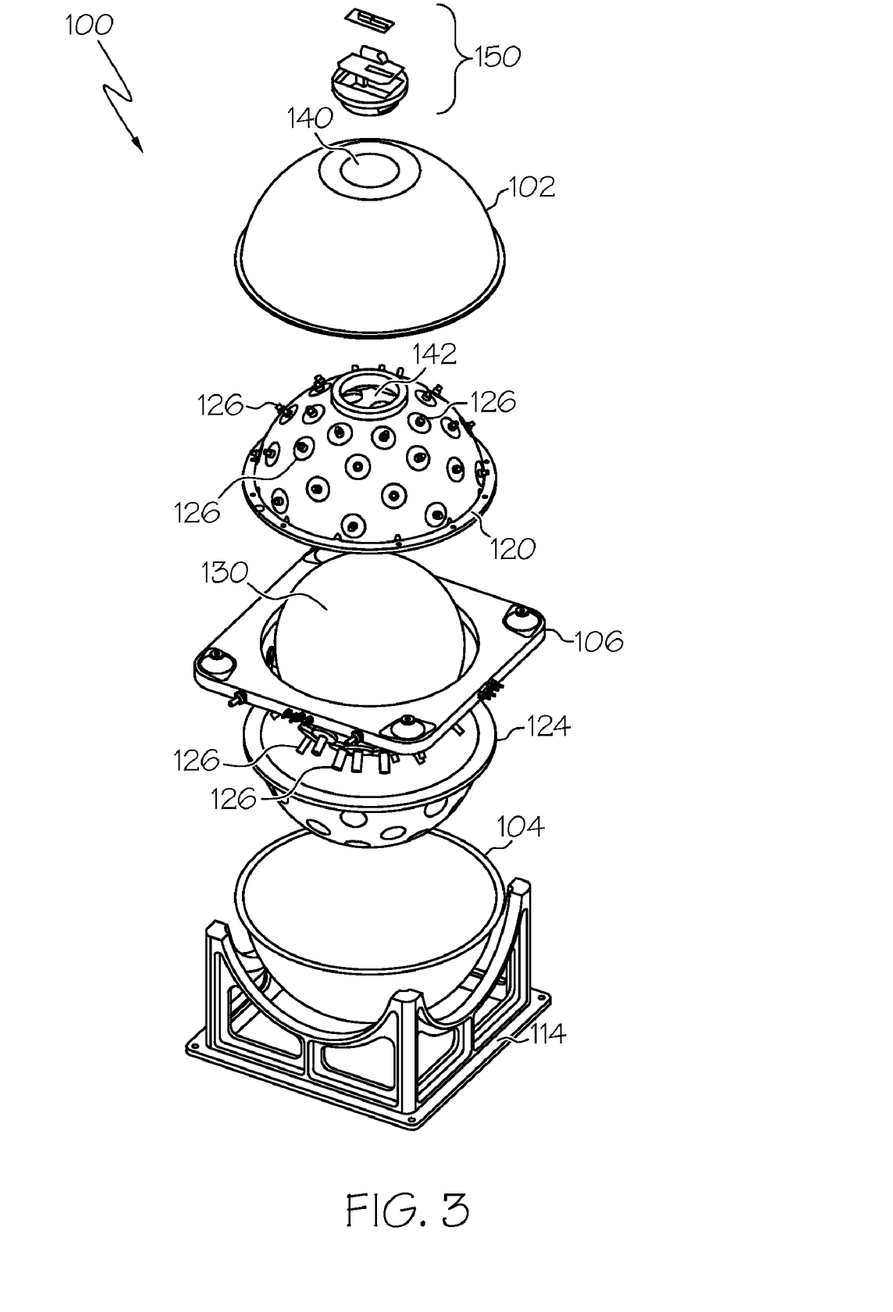
FIG. 3 is an exploded perspective view of the inertial measurement unit of FIG. 1.

FIG. 3 is an exploded perspective view of IMU 100, showing further details of the interior structures. As depicted in FIGS. 2 and 3, the support shells 120, 124 are adapted to receive a plurality of individually adjustable gas bearing pads 126 through apertures in the support shells. In one embodiment, gas bearing pads 126 are adapted to be received into threaded apertures in the support shells.

As shown in FIG. 3, a hollow sensor assembly 130 having a spherical shape is disposed in an opening of mounting plate 106. The outer shell of sensor assembly 130 can be made from a metallic material such as aluminum. The support shells 120, 124 have a larger diameter that the spherical sensor assembly to allow for mounting of gas bearing pads 126.

While the support shells and plenums are shown with a hemispherical shape to closely encase the spherical-shaped sensor assembly, other shapes can be utilized depending on the shape of the sensor assembly. For example, in an alternate embodiment the outer shell of the sensor assembly can have a cylindrical shape suited for encapsulating sensor instrumentation and allowing for suspension and rotation of the sensor assembly in a single axis of rotation. The support shells and plenums in this alternate embodiment would have a corresponding cylindrical shape to closely encase the sensor assembly.

Embedded instrumentation within sensor assembly 130 can include, but is not limited to, one or more gyroscopes, angular accelerometers, velocity meters, other inertial sensors, and various combinations thereof. The sensor assembly 130 communicates sensor data from the embedded instrumentation to a controller for the IMU. The sensor data can include data collected from outputs of the embedded instrumentation, system health indicators and alarms (e.g., battery power level and component failure indications), and programming and control instructions for electronic components within the embedded instrumentation. The sensor assembly 130 can measure the position and attitude of a vehicle in which it is mounted by measuring the accelerations and rotations applied to the vehicle's inertial frame.

The gas bearing pads 126 are preferably evenly spaced around the support shells to provide a gas bearing suspension for sensor assembly 130. The upper support shell 120 is configured to cover an upper portion of sensor assembly 130. The lower support shell 124 is configured to cover a lower portion of sensor assembly 130. With the support shells surrounding sensor assembly 130 and attached to mounting plate 106, a narrow gap is formed between sensor assembly 130 and the support shells. As shown in FIG. 3, upper gas plenum 102 has an opening 140 that communicates with an opening 142 in upper support shell 120. These openings allow for pressurized gas to exit IMU 100. A position monitoring device 150 can be placed in the openings 140 and 142 to monitor rotation and position of sensor assembly 130.

Figure 4:
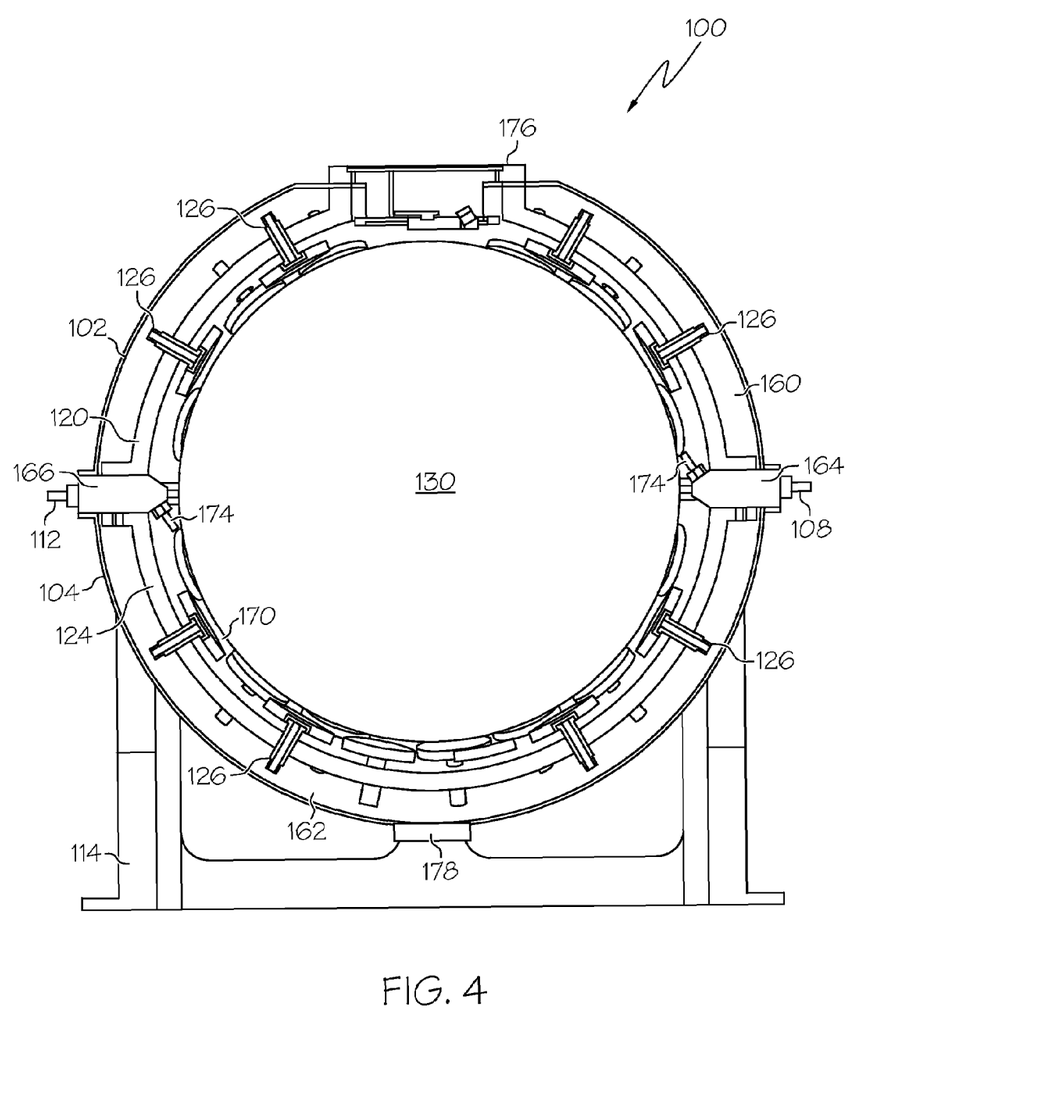
FIG. 4 is a cut away side view of the inertial measurement unit of FIG. 1.

FIG. 4 is a cut away side view of IMU 100 in assembled form, showing the positional relationship between gas plenums 102, 104, support shells 120, 124, and sensor assembly 130. An upper gas chamber 160 is formed between the inner surface of upper gas plenum 102 and the outer surface of upper support shell 120. A lower gas chamber 162 is formed between the inner surface of lower gas plenum 104 and the outer surface of lower support shell 124. An upper gas inlet 164 is in communication with upper gas chamber 160, and a lower gas inlet 166 is in communication with lower gas chamber 162. The gas chambers 160, 162 provide high pressure zones for gas that is injected into IMU 100 from gas inlets 164, 166. The plenums 102, 104 are configured to distribute a pressurized gas evenly to gas bearing pads 126. For example, a suitable gas such as air or nitrogen can be directed through jet nozzles 108, 112 into gas inlets 164, 166 for distribution in the high pressure zones of gas chambers 160, 162.

A narrow gap 170 is formed between gas bearing pads 126 and the outer surface of sensor assembly 130. The narrow gap 170 is filled with pressurized gas that is output from gas bearing pads 126. This creates a gas bearing that allows sensor assembly 130 to be freely suspended and rotated in all directions for easy calibration of the internal instrumentation. For example, narrow gap 170 can be about 0.001 inch (about 0.0254 mm) or less, such as about 0.0005 inch (about 0.0127 mm).

A plurality of gas jets nozzles 174 coupled to mounting plate 106 are positioned at the mid-plane of sensor assembly 130 and provide for three-dimensional rotation of sensor assembly 130. Sensors mounted within sensor assembly 130 can be calibrated by rotating sensor assembly 130 using gas jet nozzles 174. The movement of sensor assembly 130 can be monitored by position monitoring device 150 and properly adjusted using gas jet nozzles 174.

An upper gas outlet 176 in communication with opening 140 in upper gas plenum 102 allows pressurized gas to exit plenum 102. A lower gas outlet 178 can also be provided for lower gas plenum 104 to allow pressured gas to exit plenum 104.

Figure 5:
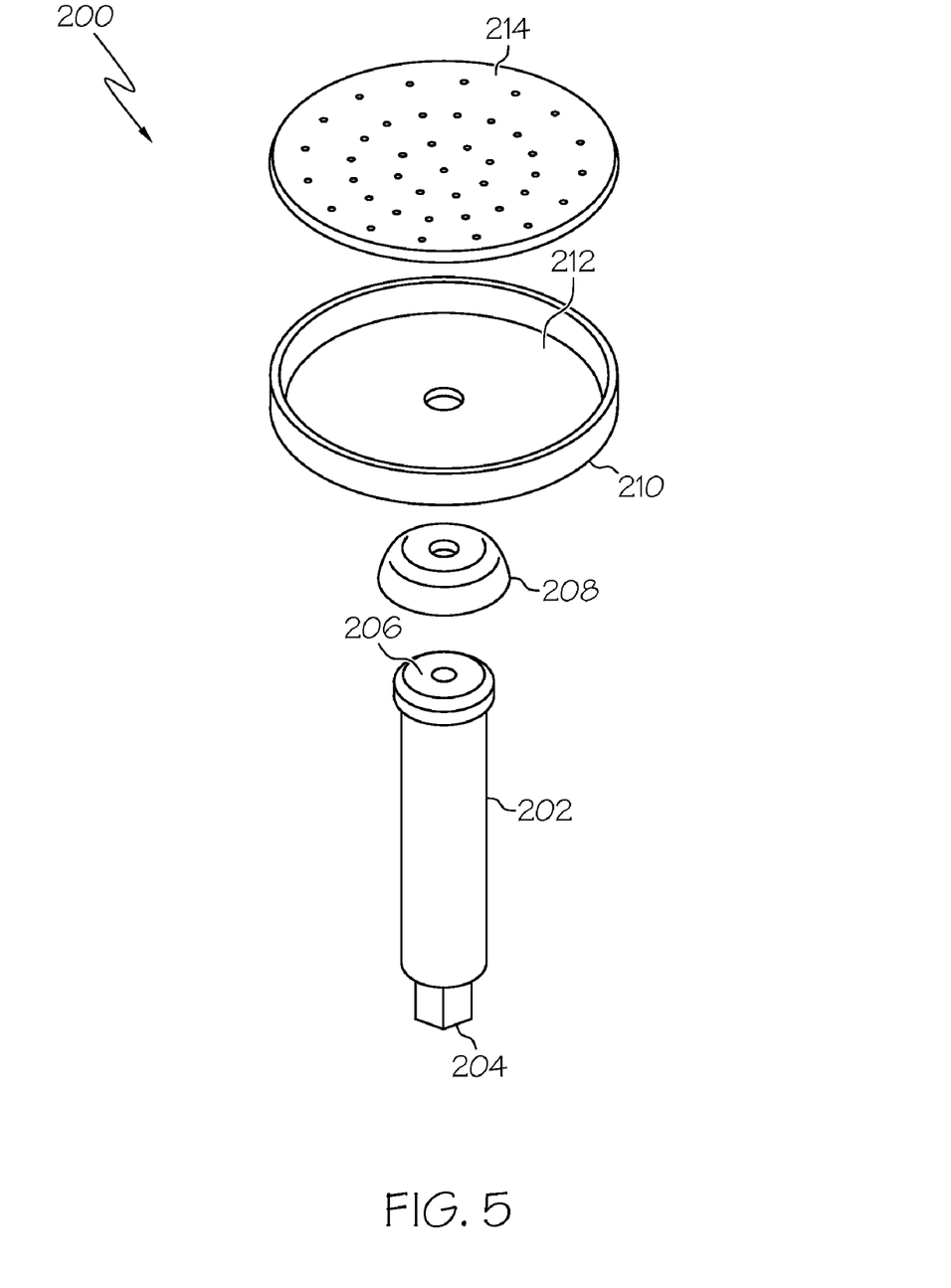
FIG. 5 is an exploded perspective view of a gas bearing pad for use in the inertial measurement unit of FIG. 1.

FIG. 5 is an exploded perspective view of a gas bearing pad 200 that corresponds to gas bearing pads 126 discussed previously. The gas bearing pad 200 includes a hollow stem 202 defining a plenum, with hollow stem 202 having an inlet 204 and an outlet 206. An elastomeric joint 208 having an opening therethrough is configured to cover outlet 206. The joint 208 provides a soft cushion that allows for self alignment and radial adjustment of bearing pad 200 to form a gas bearing gap. A gas bearing cup 210 having a cavity surface 212 with an aperture therethrough is configured to mate with joint 208 and outlet 206. A porous material 214 is configured to sit on cavity surface 212.

Figure 6:
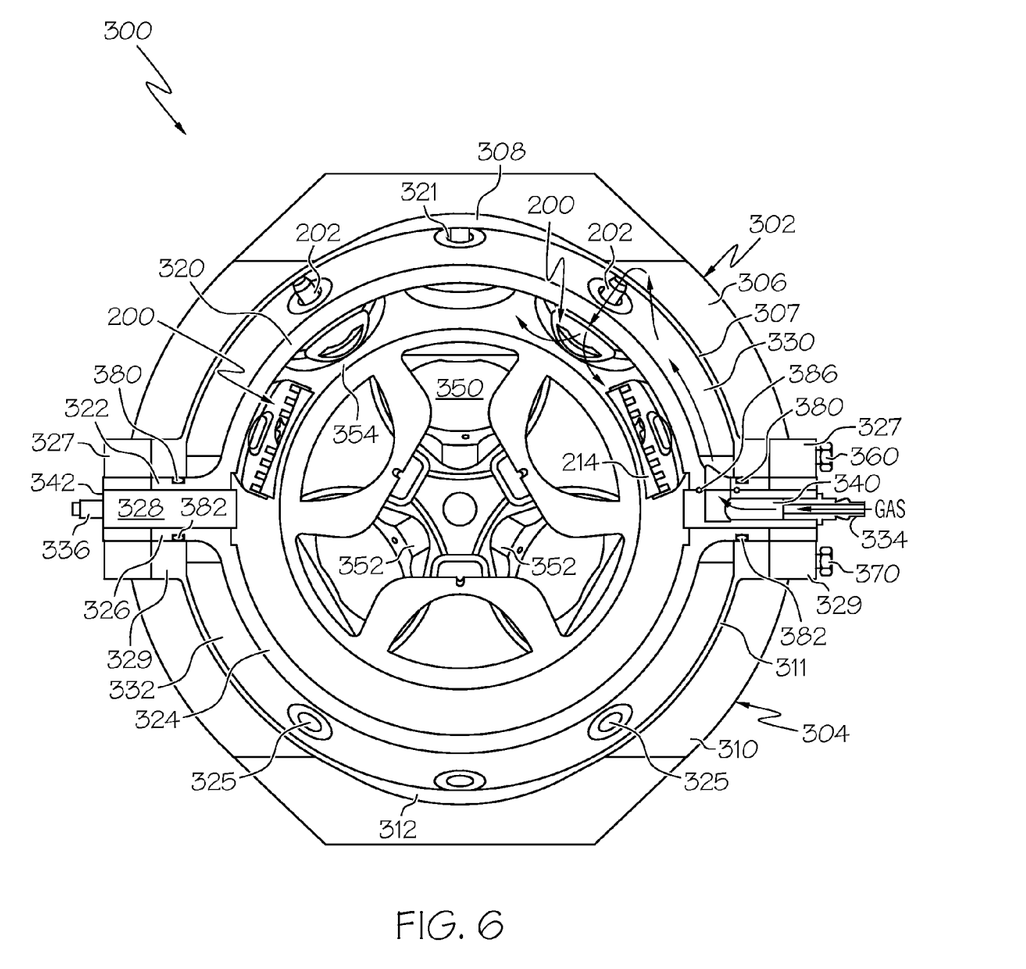
FIG. 6 is a cut away side view of an inertial measurement unit according to another embodiment.
Figure 7:
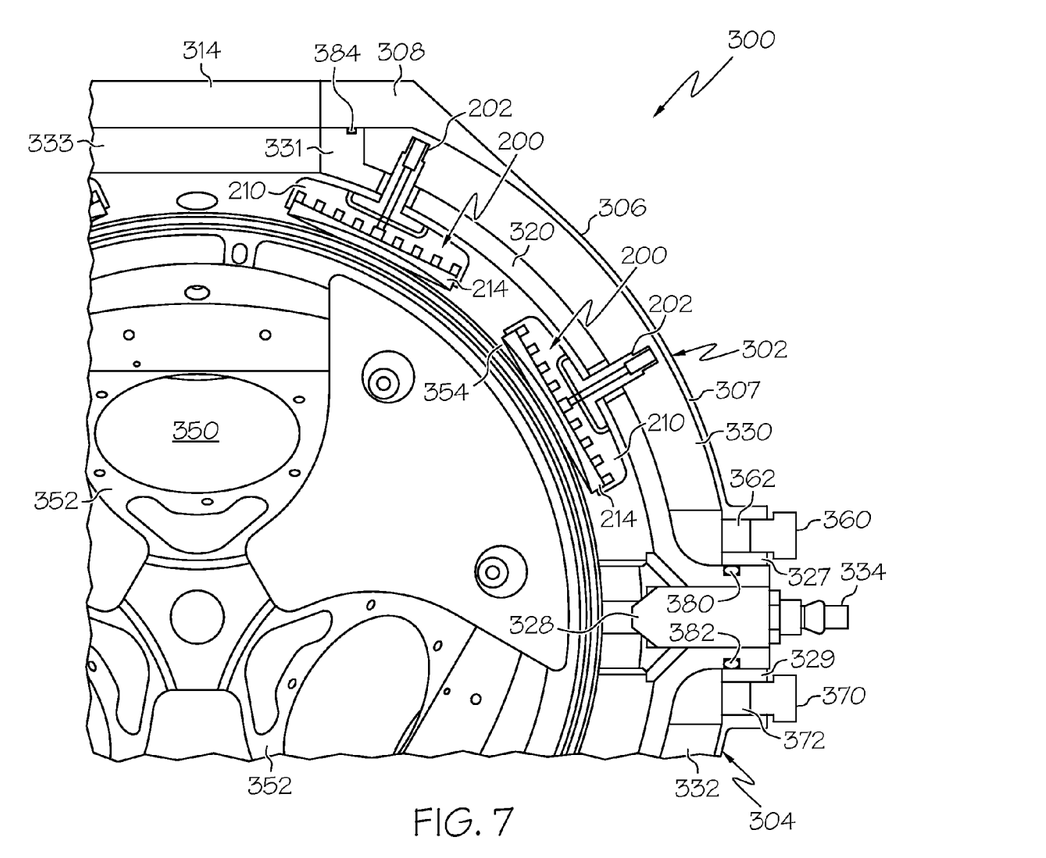
FIG. 7 is a cut away view of a portion of the inertial measurement unit of FIG. 6.

FIGS. 6 and 7 are cutaway views of an IMU 300 according to another embodiment. The IMU 300 includes similar components as IMU 100 discussed previously, along with assembled gas bearing pads 200. Accordingly, the IMU 300 includes an upper gas plenum 302 and a lower gas plenum 304. The upper gas plenum 302, however, comprises an upper outer casing 306 with an upper side portion 307 having a first thickness and an upper rim portion 308 having a second thickness that is greater than the first thickness of side portion 307. Likewise, the lower gas plenum 304 comprises a lower outer casing 310 with a lower side portion 311 having a first thickness and a lower rim portion 312 having a second thickness that is greater than the first thickness of side portion 311.

As shown most clearly in FIG. 7, side portion 307 of upper gas plenum 302 gradually tapers in thickness to rim portion 308 that is adjacent to the top of IMU 300. Likewise, side portion 311 of lower gas plenum 304 also gradually tapers in thickness to rim portion 312 that is adjacent to the bottom of IMU 300 (FIG. 6). The thicker rim portions 308, 312 of the gas plenum casings near the top and bottom of IMU 300 are configured to handle the stress of high pressure gas in the plenums. The rim portions 308, 312 also define respective upper and lower gas outlets 314 for gas exiting IMU 300. The upper and lower gas plenums 302, 304 have respective plenum flanges 327, 329. The gas plenums 302, 304 can be adapted to provide radiation shielding for IMU 300 such as discussed above for IMU 100.

An upper support shell 320 is surrounded by upper gas plenum 302 and has a plurality of apertures 321. A lower support shell 324 is surrounded by lower gas plenum 304 and has a plurality of apertures 325. The hollow stems 202 of gas bearing pads 200 extend through apertures 321, 325. The upper and lower support shells 320, 324 have respective shell flanges 322, 326 that are attached to a mounting plate 328 on upper and lower surfaces thereof. The plenum flanges 327, 329 are respectively attached to shell flanges 322, 326. The upper and lower support shells 320, 324 have respective lip portions 331 that are contiguous with rim portions 308, 312 of the gas plenum casings near the top and bottom of IMU 300. The lip portions 331 define respective top and bottom openings 333 that communicate with upper and lower gas outlets 314.

An upper gas chamber 330 is formed between outer casing 306 of upper gas plenum 302 and the outer surface of upper support shell 320. A lower gas chamber 332 is formed between outer casing 310 of lower gas plenum 304 and the outer surface of lower support shell 324. An upper gas inlet 340 formed in mounting plate 328 is in communication with upper gas chamber 330. A lower gas inlet 342 also formed in mounting plate 328 is in communication with lower gas chamber 332. A jet nozzle 334 is coupled to upper gas inlet 340, and a jet nozzle 336 is coupled to lower gas inlet 342. An O-ring 386 is interposed between mounting plate 328 and upper support shell 320 adjacent to gas inlet 340 to provide a fluid-tight seal. A similar O-ring 386 can be interposed between mounting plate 328 and lower support shell 324 adjacent to the gas inlet for lower gas chamber 332. The gas chambers 330, 332 provide high pressure zones for gas that is injected into IMU 300. Gas is directed through jet nozzles 334, 336 into gas inlets 340, 342 and passes into the high pressure zones of gas chambers 330, 332, which are configured to distribute the pressurized gas evenly to gas bearing pads 200.

A spherical sensor assembly 350 is surrounded by the upper and lower support shells 320, 324. As shown, in the cut away views of FIGS. 6 and 7, sensor assembly 350 includes internal fastening structures 352 that are configured to secure embedded instrumentation within the sensor assembly such as gyroscopes, accelerometers, and the like. The gas bearing pads 200 and the outer spherical surface of sensor assembly 350 are separated by a narrow gap 354 when pressurized gas is fed into the upper and lower gas chambers 330, 332, thereby creating a gas bearing that allows sensor assembly 350 to be freely suspended and rotated in all directions.

A first pressure relief valve 360 is coupled to upper gas plenum 302 at flange 327 adjacent to gas inlet 340. A second pressure relief valve 370 is coupled to lower gas plenum 304 at flange 329 also adjacent to gas inlet 340. The flanges 327 and 329 adjacent to gas inlet 340 define respective ports 362 and 372 (FIG. 7) that are in communication with gas chambers 330 and 332, respectively. The valves 360 and 370 are movably inserted into ports 362 and 372, respectively, to provide pressure relief for gas chambers 330 and 332.

An O-ring 380 is disposed in a slot that circumscribes shell flange 322, and an O-ring 382 is disposed in a slot that circumscribes shell flange 326. The O-rings 380, 382 respectively provide a fluid-tight seal between shell flanges 322, 326 and plenum flanges 327, 329 attached thereto. An O-ring 384 is also disposed in a slot that is on a surface of lip portion 331 of upper support shell 320 to provide a fluid-tight joint between lip portion 331 and rim portion 308 of gas plenum 302. A similar O-ring 384 can also be disposed in a slot that is on a surface of the lip portion of lower support shell 324 to provide a fluid-tight joint between this lip portion and rim portion 312 of gas plenum 304.

FIG. 6 shows the path of gas flow during operation of IMU 300. Pressurized gas is directed through nozzle 334 into gas inlet 340 and is distributed in the high pressure zone of gas chamber 330 of upper gas plenum 302. The pressurized gas is then fed through hollow stems 202 of bearing pads 200 from chamber 330, with the gas bearing cups 210 distributing the gas to the backside of porous materials 214. As shown in FIGS. 6 and 7, porous materials 214 can have a concave shaped surface that faces the convex curvature of the spherical shell of sensor assembly 350. The porous materials 214 allow gas to be evenly emitted to gap 354 at a high pressure, but a low volume flow rate. This provides a high pressure gas bearing between bearing pads 200 and the outer surface of sensor assembly 350. The gas bearing allows sensor assembly 350 to rotate freely in a near frictionless environment, which provides for easy calibration of sensors in sensor assembly 350.

In an alternate embodiment, gas in IMU 300 can be recirculated in a closed loop system. In operation, the closed loop system captures gas that exits from IMU 300, and the gas is routed to a heat exchanger and pump to be reused in the IMU. This allows IMU 300 to operate in a vacuum environment for an extended period of time by reuse of the self-contained gas. The thermal properties of the gas can be controlled by the heat exchanger in terms of adding or rejecting heat from the gas.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An inertial measurement unit, comprising:
    a mounting plate with an upper surface, a lower surface, and an opening therethrough;
    a sensor assembly disposed in the opening of the mounting plate;
    an upper support shell having a shell flange attached to the upper surface of the mounting plate, the upper support shell surrounding an upper portion of the sensor assembly and having a plurality of apertures;
    a lower support shell having a shell flange attached to the lower surface of the mounting plate, the lower support shell surrounding a lower portion of the sensor assembly and having a plurality of apertures;
    a plurality of gas bearing pads extending through the apertures in the upper and lower support shells, the plurality of gas bearing pads configured to receive pressurized gas;
    an upper gas plenum having a plenum flange attached to the shell flange of the upper support shell, the upper gas plenum surrounding the upper support shell;
    a first pressure relief valve coupled to the plenum flange of the upper gas plenum;
    a lower gas plenum having a plenum flange attached to the shell flange of the lower support shell, the lower gas plenum surrounding the lower support shell; and
    a second pressure relief valve coupled to the plenum flange of the lower gas plenum;
    wherein the gas bearing pads and the sensor assembly are separated by a gap when pressurized gas is fed into the upper and lower gas plenums, thereby creating a gas bearing that allows the sensor assembly to be freely suspended and rotated in all directions.

2. The inertial measurement unit of claim 1, wherein the sensor assembly comprises an outer shell with a substantially spherical shape.

3. The inertial measurement unit of claim 1, wherein the upper and lower gas plenums each comprise an outer casing with a side portion having a first thickness and a rim portion having a second thickness greater than the first thickness.

4. The inertial measurement unit of claim 3, wherein the side portions of the outer casings gradually taper in thickness to the rim portions.

5. The inertial measurement unit of claim 1, wherein the upper and lower gas plenums are each adapted to provide radiation shielding.

6. The inertial measurement unit of claim 1, further comprising:
    a first O-ring disposed in a slot that circumscribes the shell flange of the upper support shell; and
    a second O-ring disposed in a slot that circumscribes the shell flange of the lower support shell;
    wherein the first and second O-rings respectively provide a fluid-tight seal between the shell flanges of the upper and lower support shells and the corresponding plenum flanges attached thereto.

7. The inertial measurement unit of claim 3, further comprising an O-ring disposed in a slot on a surface of a lip portion of the upper and lower support shells, the O-ring providing a fluid-tight joint between the lip portions and the rim portions of the gas plenums.

8. The inertial measurement unit of claim 1, wherein the upper and lower support shells have a substantially hemispherical shape, and the upper and lower gas plenums have a substantially hemispherical shape.

9. The inertial measurement unit of claim 1, wherein the sensor assembly comprises one or more inertial sensors.

10. The inertial measurement unit of claim 9, wherein the inertial sensors comprise one or more accelerometers, gyroscopes, velocity meters, or combinations thereof.

11. The inertial measurement unit of claim 1, further comprising a plurality of gas jet nozzles coupled to the mounting plate, the gas jet nozzles configured to provide three-dimensional rotation of the sensor assembly.

12. The inertial measurement unit of claim 1, further comprising at least one gas inlet in the mounting plate for feeding gas into the upper gas plenum, and at least one gas inlet in the mounting plate for feeding gas into the lower gas plenum.

13. The inertial measurement unit of claim 1, wherein the lower gas plenum is set in a support frame attached to the mounting plate.

14. The inertial measurement unit of claim 1, further comprising a monitoring device placed in openings of the upper gas plenum and the upper support shell, the monitoring device configured to monitor rotation and position of the sensor assembly.

15. The inertial measurement unit of claim 1, further comprising an upper gas outlet in the upper gas plenum, and a lower gas outlet in the lower gas plenum.

16. The inertial measurement unit of claim 1, wherein the gas bearing pads are substantially evenly spaced around the upper and lower support shells.

17. The inertial measurement unit of claim 2, wherein the gas bearing pads each comprise:
   a hollow stem defining a plenum, the hollow stem having an inlet and an outlet;
   an elastomeric joint having an opening therethrough and coupled to the hollow stem over the outlet;
   a gas bearing cup having a cavity surface with an aperture therethrough and coupled to the elastomeric joint; and
   a porous material on the cavity surface, wherein the porous material has a concave-shaped surface that faces a convex curvature of the spherical outer shell of the sensor assembly.

18. The inertial measurement unit of claim 1, wherein the gas bearing pads are configured to receive pressurized gas from the upper and lower gas plenums.

19. The inertial measurement unit of claim 1, wherein the upper and lower gas plenums are configured to operate at different gas pressures.

20. An inertial measurement unit, comprising:
   an upper gas plenum comprising an upper outer casing with a side portion having a first thickness and a rim portion having a second thickness greater than the first thickness;
   a lower gas plenum comprising a lower outer casing with a side portion having a first thickness and a rim portion having a second thickness greater than the first thickness of the rim portion of the lower outer casing;
   an upper support shell surrounded by the upper gas plenum, the upper support shell having a plurality of apertures;
   an upper gas chamber between the upper outer casing and the upper support shell;
   a lower support shell surrounded by the lower gas plenum, the lower support shell having a plurality of apertures;
   a lower gas chamber between the lower outer casing and the lower support shell;
   a sensor assembly surrounded by the upper and lower support shells;
   a plurality of gas bearing pads extending through the apertures in the upper and lower support shells, the plurality of gas bearing pads configured to receive pressurized gas from the upper and lower gas chambers;
   wherein the gas bearing pads and the sensor assembly are separated by a gap when pressurized gas is fed into the upper and lower gas chambers, thereby creating a gas bearing that allows the sensor assembly to be freely suspended and rotated in all directions.

* * * * *